US005826928A

United States Patent [19]

Shang

[11] Patent Number: 5,826,928

[45] Date of Patent: Oct. 27, 1998

[54] MULTIFUNCTIONAL DEVICE FOR CATCHING AND HOLDING AN OBJECT

[76] Inventor: Chen Shui Shang, 199 Su Mau Road, Ho Mei Township, Chan Hua Hsien, Taiwan

[21] Appl. No.: 963,844

[22] Filed: Nov. 4, 1997

[30] Foreign Application Priority Data

Nov. 13, 1996 [CN] China .................................. 96243440

[51] Int. Cl.$^{6}$ ................................ B25J 1/02; B25J 15/06

[52] U.S. Cl. ........................... 294/24; 294/65.5; 294/100

[58] Field of Search .................................. 294/2, 3, 19.1, 294/22–24, 65.5, 99.1, 100; 15/104.32; 81/487, 488; 335/285, 293, 302, 303

[56] References Cited

U.S. PATENT DOCUMENTS 2,683,618 7/1954 Long ..................................... 294/65.5
2,834,241 5/1958 Chowning .......................... 294/65.5 X
2,976,075 3/1961 Budrack ................................ 294/65.5
4,575,143 3/1986 Nast ...................................... 294/65.5

*Primary Examiner*—Johnny D. Cherry
*Attorney, Agent, or Firm*—Harrison & Egbert

[57] ABSTRACT

A device for catching and holding an object is composed of a flexible sleeve provided with a magnetic element slidably fitted thereover. The magnetic element is sheathed by a jacket extending to form a locating body capable of locating at the bottom of the handle body or a protruded edge of a receiving portion of the flexible sleeve. The device includes a rod body provided at a top thereof with a button and at a bottom end thereof with a plurality of elastic claw pieces. The rod body is provided sequentially with a compression spring and a flexible sleeve provided at a top thereof.

1 Claim, 5 Drawing Sheets

MULTIFUNCTIONAL DEVICE FOR CATCHING AND HOLDING AN OBJECT

FIELD OF THE INVENTION

The present invention relates generally to a hand tool, and more particularly to a device for catching and holding an object.

BACKGROUND OF THE INVENTION

The conventional device for catching and holding an object is generally defective in design in that it is incapable of catching and holding an object which is either heavy or large.

SUMMARY OF THE INVENTION

The primary objective of the present invention is therefore to provide an improved device for catching and holding an object effectively. The device is provided with a magnetic element which is sheathed by a jacket which extends to form a locating body, thereby enabling the magnetic element to be located securely.

The foregoing objective, features and functions of the present invention will be more readily understood upon a thoughtful deliberation of the following detailed description of an embodiment of the present invention with reference to the accompanying drawings.

DETAILED DESCRIPTION OF THE EMBODIMENT

Figure 1:
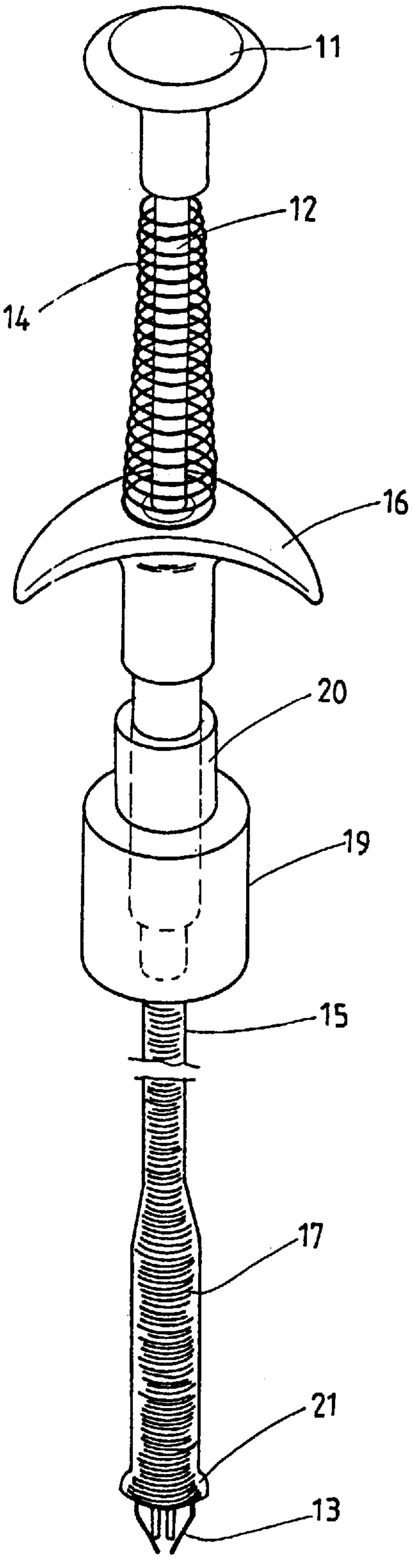
FIG. 1 shows a perspective view of the embodiment of the present invention.
Figure 2:
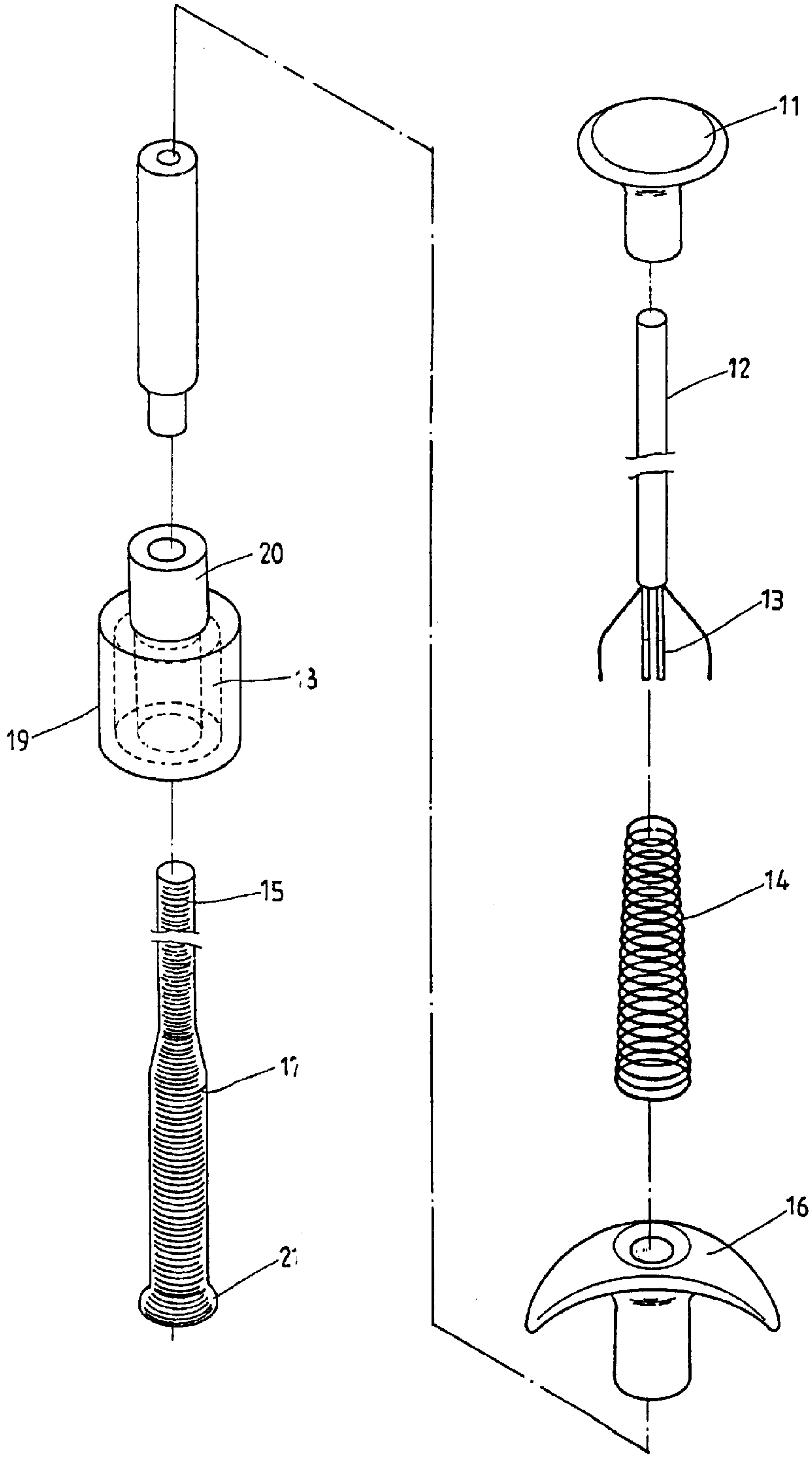
FIG. 2 shows an exploded view of the embodiment of the present invention.
Figure 3:
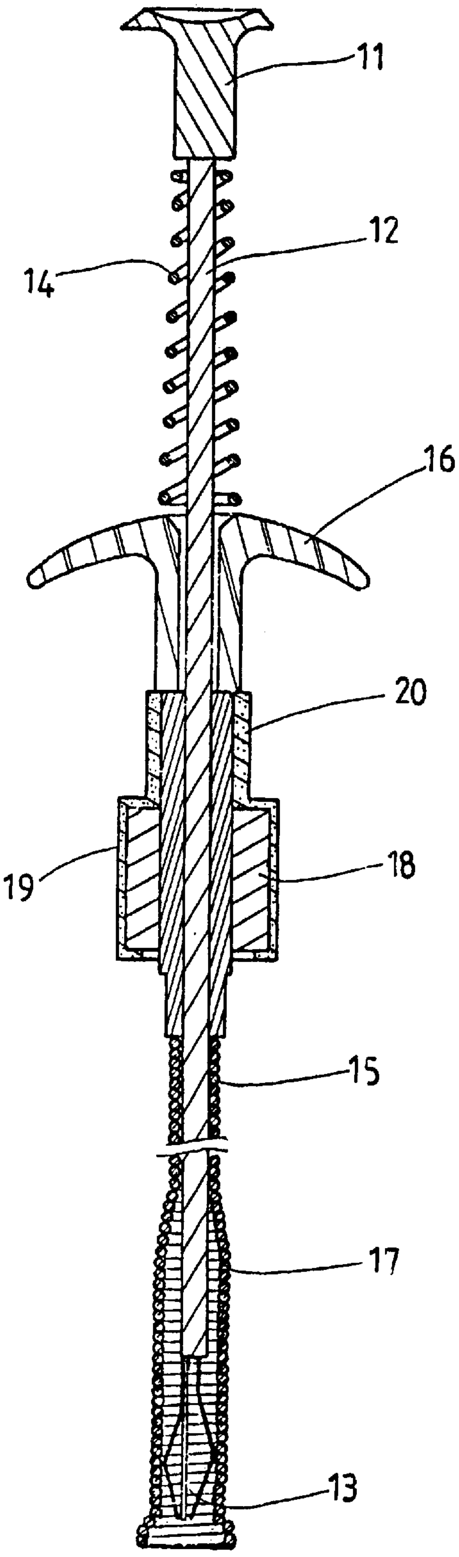
FIG. 3 shows a sectional view of the embodiment of the present invention.

As shown in FIGS. 1, 2 and 3, the embodiment of the present invention comprises a rod body 12 provided at the top end thereof with a button 11 and at the bottom end thereof with a plurality of elastic claw pieces 13. The rod body 12 is sequentially provided with a compression spring 14 and a flexible sleeve 15 which is provided at the top thereof with a handle body 16 and at the bottom thereof with a receiving portion 17. The present invention is characterized in design in that a magnetic element 18 is slidably engaged with the flexible sleeve 15. The magnetic element 18 is sheathed by a jacket 19 which extends upwards to form a locating body 20 which is located at the bottom of the handle body 16 or the protruded edge 21 of the receiving portion 17 of the flexible sleeve 15.

Figure 4:
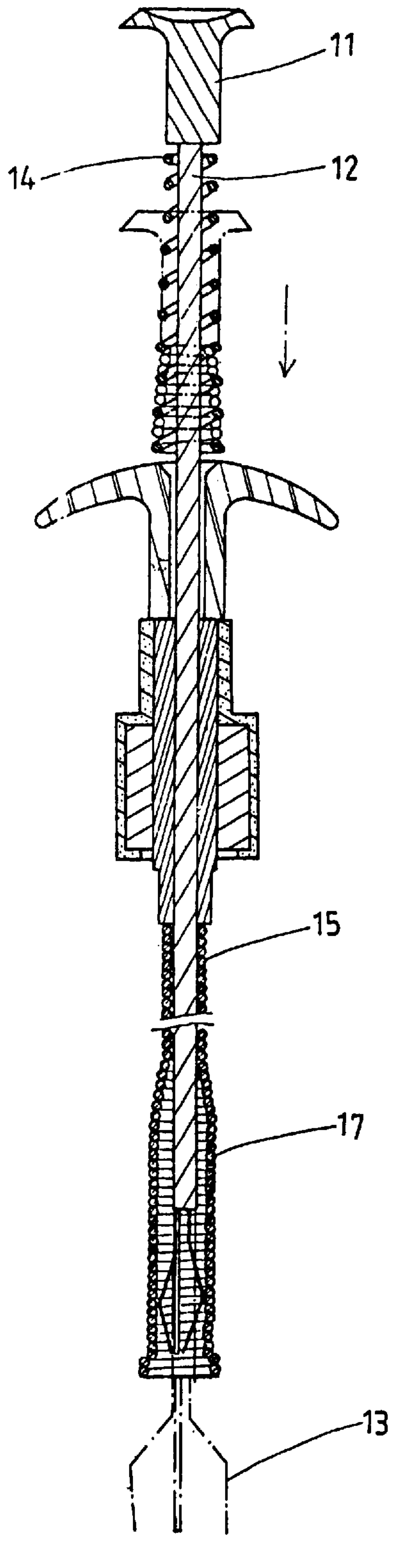
FIG. 4 shows a schematic view of the present invention in operation.
Figure 5:
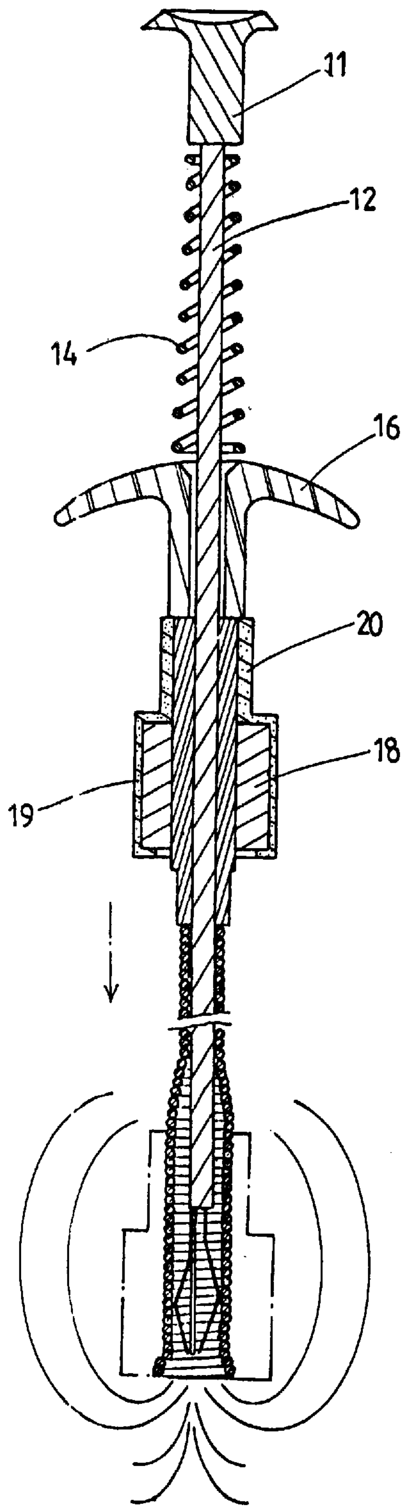
FIG. 5 shows another schematic view of the present invention in operation.

As shown in FIG. 4, the operation of the present invention involves the first step in which the handle body 16 is first securely retained before the button 11 is pressed to bring about the compression of the compression spring 14. As a result, the claw pieces 13 are slipped out of the receiving portion 17 to catch an object, as illustrated in FIG. 4. In the meantime, the magnetic element 18 is slidably mounted on the protruded edge 21 of the receiving portion 17 of the flexible sleeve 15 and is located by means of the locating body 20 so as to attract the object. As the button 11 is relieved of the pressure of the finger pressing the button 11, the compression spring 14 is automatically decompressed to allow the rod body 12 to move upwards, thereby causing the claw pieces 13 to retract into the receiving portion 17. The claw pieces 13 are aided by the magnetic element 18 to reduce the load of the claw pieces 13. In other words, the magnetic element 18 is capable of preventing the caught object from swaying. The present invention can be operated without the participation of the magnetic element 18.

What is claimed is:

1. A device for catching and holding an object, said device comprising a rod body provided at a top end thereof with a button and at a bottom end thereof with a plurality of elastic claw pieces, said rod body further provided sequentially with a compression spring and a flexible sleeve provided at a top thereof with a handle body and at a bottom thereof with a receiving portion; wherein said flexible sleeve is provided with a magnetic element slidably fitted thereover, said magnetic element sheathed by a jacket extending to form a locating body capable of locating at a bottom of said handle body or a protruded edge of said receiving portion of said flexible sleeve.

* * * * *